United States Patent Office 3,074,910
Patented Jan. 22, 1963

---

3,074,910
STABILIZATION OF POLYOLEFINS WITH A NICKEL PHENOLATE OF A BIS(p-ALKYL PHENOL) MONOSULFIDE AND AN o-HYDROXY PHENYL BENZOTRIAZOLE
David M. Dickson, Jr., Framingham, Mass., assignor to Hercules Powder Company, Wilmington, Del., a corporation of Delaware
No Drawing. Filed Nov. 17, 1960, Ser. No. 69,801
5 Claims. (Cl. 260—45.75)

The present invention relates to polyolefin compositions and, more particularly, to the stabilization of stereoregular polymers of propylene and higher α-olefins against degradation by light.

Highly crystalline, high molecular weight stereoregular polymers of propylene and higher α-olefins are well known. One of the deficiencies of such polymers which must be overcome to enable their use in many applications is poor stability against the deleterious effect of light.

It is disclosed in Belgian Patent 579,636 that bis(p-alkylphenol) sulfides in which all or part of the phenolic hydrogen atoms have been replaced by nickel are effective light stabilizers for stereoregular polypropylene. Later discoveries showed the same compound to be effective light stabilizers for stereoregular polymers of α-olefins higher than propylene.

It has now been found that the light stability of these stereoregular polymers can be increased to a much greater degree by employing a synergistic combination of stabilizers comprising (1) a bis(p-alkylphenol) sulfide in which all or part of the phenolic hydrogens are replaced by nickel, and (2) an o-hydroxyphenylbenzotriazole having the formula

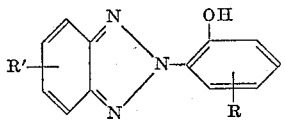

wherein R and R' are selected from the group consisting of hydrogen, hydrocarbon and oxahydrocarbon radicals. A still further increase in light stability can be achieved by also incorporating a phenolic compound in the polymer. In fact, such outstanding light stability is obtained that it makes these stereoregular polymers useable for many applications requiring prolonged outdoor exposure.

Although any stereoregular polymer of a mono-α-olefin having at least 3 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methylpentene-1).

The nickel compounds used as stabilizers in the invention are generically termed herein as "nickel phenolates" of bis(p-alkylphenol) sulfides, the quoted term being inclusive of both full nickel phenolates, in which all of the phenolic hydrogen atoms are replaced by nickel, and nickel phenol—phenolates, in which some but not all of the phenolic hydrogens are replaced by nickel. The alkyl groups preferably each contain from 2 to 12 carbon atoms. Typical nickel phenolates useful in the invention are those of bis(p-ethylphenol) sulfide, bis(p-isopropylphenol) sulfide, bis(p-cyclohexylphenol) sulfide, bis(p-amylphenol) sulfide, bis(p-tetramethylbutylphenol) sulfide and bis(p-dodecylphenol) sulfide. Information on the preparation of these nickel phenolates can be found in the aforementioned Belgian patent.

The o-hydroxyphenylbenzotriazoles used as additives in accordance with the invention are known compounds. They are conveniently prepared by diazotizing o-nitroaniline containing the desired R' substituent, coupled with a phenol containing the desired R substituent, and reducing the resulting o-nitroazophenol with zinc and a base.

In the previously assigned formula, the permissible R and R' substituents are numerous and varied. R and R', as stated, may each be hydrogen, in which case the compound is o-hydroxyphenylbenzotriazole, or each may be a hydrocarbon or oxahydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxahydrocarbon radicals are methoxy, ethoxy, propoxy, isopropoxy and the like.

The amount of the two stabilizers incorporated in the polyolefin may be varied from a very small stabilizing amount up to several percent, but outstanding results have been obtained when from about 0.01% to about 5% and preferably from about 0.05% to about 1.0% of the o-hydroxyphenylbenzotriazole is used in combination with from about 0.01% to about 5.0% and preferably from about 0.05% to about 2.0% of the nickel phenolate.

The two stabilizers used in accordance with this invention may be admixed with the polyolefin by any of the usual procedures for incorporating a stabilizer in a solid material. A simple method is to dissolve the stabilizers in a low-boiling solvent such as acetone and, after thoroughly mixing the solution with the polymer in flake or other such form, evaporating the solvent, or they may be incorporated by various means of mechanical mixing, etc.

The stabilizing combination of this invention may be used in combination with other stabilizers such as other ultraviolet light absorbers, antacids such as calcium soaps, e.g., calcium stearate, or antioxidants. Other materials may also be incorporated in the polymer as, for example, pigments, dyes, fillers, etc.

The following examples will illustrate the degree of stabilization that is obtained when a polyolefin is stabilized in accordance with this invention. The term "RSV" as used herein denotes reduced specific viscosity which is the specific viscosity divided by concentration of a 0.1% weight/volume solution of polymer in decahydronaphthalene at 100° C. All parts and percentages are by weight unless otherwise stated, and the percentage of stabilizer is based on the weight of polymer.

EXAMPLES 1–12

In these examples different portions of stereoregular polypropylene having a birefringent melting point of about 165° C. and a reduced specific viscosity of 3.5 were thoroughly blended with various amounts of nickel phenolates of bis(p-alkylphenol) sulfides and o-hydroxyphenylbenzotriazoles (Table I), alone and in combination with each other, and in some instances also in combination with a phenolic compound. Each blend was extruded into molding powders at 210° C. and the molding powder was then pressed into sheets 0.025 inch thick. Strips cut from these sheets, 0.5 inch wide, were fastened onto pieces of white cardboard and placed in a Fadeometer. A duplicate series of strips was also exposed to outdoor weathering in Miami, Florida, at a 45° angle facing south. During exposure the development of brittleness in each strip was observed by periodically examining the strips and noting the time elapsed until each became brittle, the embrittlement point being reached when a strip breaks upon being bent double. Compositions and exposure data are as follows:

Table I

| Formulation (percent): | 1 | 2 | 3 | 4 | 5 | 6 | 7 | 8 | 9 | 10 | 11 | 12 |
|---|---|---|---|---|---|---|---|---|---|---|---|---|
| Nickel phenolate of bis(p-tetramethylbutylphenol) sulfide (6.1% Ni) | No additive | 0.5 | ---- | ---- | 0.5 | ---- | 0.5 | 0.5 | ---- | ---- | ---- | ---- |
| Full nickel phenolate of bis(p-amylphenol) sulfide | ----do---- | ---- | ---- | ---- | ---- | ---- | ---- | ---- | 0.5 | 0.5 | 0.5 | 0.5 |
| 2(2-hydroxy-5-methylphenyl)benzotriazole | ----do---- | ---- | ---- | 0.5 | 0.5 | 0.5 | ---- | 0.5 | ---- | ---- | 0.5 | 0.5 |
| Heat stabilizer [1] (phenolic compound) | ----do---- | ---- | 0.5 | ---- | ---- | 0.5 | 0.5 | 0.5 | ---- | 0.5 | ---- | 0.5 |
| Fadeometer embrittlement time (hrs.) | <24 | 200 | 48 | <24 | 350 | 96 | 420 | 722 | 205 | 414 | 400 | 1,004 |
| Outdoor embrittlement time (mos. in Florida) | <1 | 1-2 | <1 | <1 | 2 | 2 | 2 | 3 | 1-2 | 2 | 2 | >4 |

[1] Mixture of 2,2-isopropylidene-bis(p-nonylphenol) and 2(2'-hydroxyphenyl)-2,4,4-trimethyl-5',6-dinonylchroman prepared by condensing 2 moles of p-nonylphenol with 1 mole of acetone.

From the data it is obvious that a synergistic improvement in light stability is obtained when the two compounds previously described are employed in combination with each other to stabilize stereoregular polypropylene. Although the examples illustrate the stabilization of stereoregular polypropylene, the invention also provides a comparable degree of improvement in other stereoregular polymers of α-olefins higher than propylene.

As previously mentioned, one of the preferred, but optional, modifications of the invention comprises incorporating into the polymer a phenolic compound in addition to the nickel salt and the o-hydroxyphenylbenzotriazole. The phenolic compound, when used, preferably comprises from 0.01 to 5% by weight of the polymer. Suitable phenolic compounds that are useful in this embodiment include alkyl phenols, bisphenols, terpene phenols, aralkyl phenols and polyalkylchromans. Typical alkyl phenols that can be used include di-tert-butyl-p-cresol, o-nonylphenol, o,o-diisopropylphenol, etc. Bisphenols that are useful include 2,2'-methylene-bis(5-isopropylphenol),
2,2'-methylene-bis-(4-methyl-6-isopropylphenol),
2,2'-methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis-(4-methyl-6-tert-butylphenol),
2,2'-isobutylidene-bis-(4-nonylphenol), etc.

Polyalkyl chromans that can be employed include

2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)-5',6-di-tert-butyl-2,4,4-trimethylchroman,
4(2'-hydroxyphenyl)-5',6-di-tert-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

Terpene phenols useful in this modification are reaction products of a terpene and a phenol as exemplified by 2,6-diisobornyl-p-cresol, 2,4-dimethyl-6-isobornylphenol, and similar products made by condensing phenol or an alkylphenol with a cyclic unsaturated terpene or dihydroterpene, e.g., camphene, carvomenthene, diphentene, α-pinene and the like.

What I claim and desire to protect by Letters Patent is:

1. A stereoregular polymer of an α-olefin having at least three carbon atoms, containing as additives thereto a small amount of a nickel phenolate of a bis(p-alkylphenol) sulfide and a small amount of an o-hydroxyphenyl benzotriazole having the formula

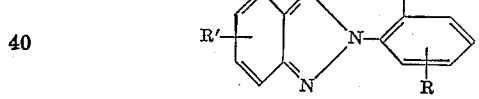

wherein R and R' are selected from the group consisting of hydrogen, hydrocarbon and oxahydrocarbon radicals.

2. The composition of claim 1 in which the polymer is polypropylene.

3. The composition of claim 1 in which the nickel phenolate is a nickel phenolate of bis(p-tetramethylbutylphenol) sulfide.

4. The composition of claim 1 in which the nickel phenolate is a nickel phenolate of bis(p-amylphenol) sulfide.

5. The composition of claim 1 in which the o-hydroxyphenylbenzotriazole is 2(2-hydroxy-5-methylphenyl) benzotriazole.

References Cited in the file of this patent

UNITED STATES PATENTS

| 2,837,528 | Pugin et al. | June 3, 1958 |
| 2,971,941 | Fuchsman et al. | Feb. 14, 1961 |
| 2,995,540 | Duennenberger | Aug. 8, 1961 |

FOREIGN PATENTS

| 716,338 | Great Britain | Oct. 6, 1954 |